United States Patent Office 3,072,467
Patented Jan. 8, 1963

3,072,467
FUEL GEL
Sol B. Wiczer, 1815 H St. NW., #516, Washington, D.C.
No Drawing. Filed June 10, 1960, Ser. No. 35,108
7 Claims. (Cl. 44—7)

The present invention relates to a solidified gel fuel comprising a mixture of gelating agents for a polar type organic liquid such as alcohol as the combustible liquid.

In my prior Patent 2,613,142, whose disclosure is here incorporated by reference, I disclosed the use of methyl cellulose as a gelating agent. It has the outstanding advantage that gel formed therewith is substantially stable with respect to syneresis. However, it has the disadtage that the cellulosic residue becomes gummy with heat and tends to remain as a charred residue when the alcohol has been exhausted therefrom by combustion. Other cellulosic compounds, such as esters of organic acids like cellulose acetate and other lower alkanoic acids, and ethers like carboxy methyl cellulose and the like, also do not burn completely, but otherwise are good gelating agents.

I have now found that fuel gels formed with such charring cellulose ester and ether gelating agents like methyl cellulose admixed with at least about 3% by weight of nitro cellulose will generally burn more completely, leaving less residue. I may use more than 3% of nitro cellulose in admixture with such cellulosic ether or ester gelating agent as methyl cellulose, such as up to 75% of nitro cellulose in admixture with the methyl cellulose, the balance being charring cellulose compound like methyl cellulose. Though my gelating agent may comprise from 3 to 75% nitro cellulose and from 97 to 25% charring gelating agent like methyl cellulose, cellulose acetate, carboxy methyl cellulose, and cellulose sulfate, preferably I would use from 15 to 25% nitro cellulose, the balance being charring cellulose such as methyl cellulose.

The gel is composed of about 5 to 20% of gelating agent, depending upon how viscous a gel is desired. The methyl cellulose preferably used is the same as described in my prior patent. The combustible liquid alcohol may be any lower alcohol, such as methyl, ethyl, propyl or isopropyl alcohols, ranging from about 65 to 95% in concentration, the balance being water. Sometimes, other combustible liquids such as acetone, diethyl ether, gasoline or benzol may be admixed with the alcohol to modify its combustible characteristics when added thereto in small quantity, not usually exceeding about 25%, the balance being the alcohol and water, as described.

The nitro cellulose component is the nitro cellulose of commerce, usually nitrated to a degree less than used to produce explosive nitro cellulose, i.e., the nitro cellulose will generally be nitrated to about a 12 to 12.5% nitrogen content.

There are several ways of forming my fuel gel. The methyl cellulose gel may be formed as described in my patent, that is, by adding a few percent, such as 5 to 20% of methyl cellulose to the alcohol by merely admixing the components cold, and thereafter, dry nitro cellulose in finely divided form is stirred into the gel thus formed to homogenously distribute it. As another method, a gel pre-formed, using nitro cellulose as the sole gelating agent, may be evenly admixed by stirring with a gel formed with methyl cellulose. As a further method, the dry gelating agents in admixture may be first wet with dry alcohol, usually cold alcohol, partially dissolving the nitro cellulose, and the product thereafter is further mixed with alcohol containing sufficient water to impart to the final mixture about a 5 to 35% water content.

The following examples will illustrate the practice of this invention:

*Example 1.*—1 lb. of 4,000 cps. methyl cellulose is evenly mixed with ¼ lb. of 12.3% nitro cotton, and the dry mixture is then agitated with 1.5 gallons of 85% ethyl alcohol until a smooth gel is obtained. The gel may be packaged in cans or in tubes. It will burn, leaving a much reduced residue as compared to methyl cellulose alone.

*Example 2.*—1 lb. of 4,000 cps. methyl cellulose is admixed with 1 gallon of 90% ethyl alcohol, and ½ lb. of 12.4% nitro cotton is stirred into the gelatinous mixture until it is homogenous.

*Example 3.*—½ lb. of 4,000 cps. methyl cellulose is evenly admixed with ½ lb. of 12.4% nitro cotton. The mixture is wet with 1 gallon of 95% ethyl alcohol, pre-chilled to $-10°$ F. and stirred to a homogenous suspension. Thereafter, stirring is continued with a dropwise addition of water until the volume is increased by about 10%, the total product forming, with continued slow agitation, a homogenous gel.

Various modifications will be apparent to one skilled in the art, and, accordingly, it is intended that the description herein be considered as exemplary and not limiting, except as defined in the claims appended hereto.

I claim:

1. A fuel gel comprising a major proportion of a lower alkanol having a minor water content, gelled with a minor gelating proportion of a mixture of cellulose compounds comprising methyl cellulose and nitro cellulose, the nitro cellulose being in proportion of 3 to 75% of the cellulose compound mixture.

2. A fuel gel comprising a major proportion of a lower liquid alcohol as the liquid fuel component, gelled with a mixture of methyl cellulose and nitro cellulose in quantity in the range of 5 to 35% of the gelating mixture, the nitro cellulose component being in the range of 3 to 75% of the cellulose component mixture.

3. A fuel gel comprising a volatile combustible liquid composed of at least 65% of an aqueous solution of a lower alkanol, having 1 to 3 carbon atoms, said aqueous solution of a lower alkanol consisting of at least 65% alkanol, the balance being substantially water, said combustible liquid being gelled with 3 to 50% by weight of a mixture of methyl cellulose and nitro cellulose, the nitro cellulose being present in quantity of about 5 to 75% of the cellulose mixture.

4. The fuel gel as defined in claim 3, in which the gelating agent is 5 to 20% of the composition, and the alcohol is commercial methyl alcohol.

5. The fuel gel as defined in claim 3, in which the gelating agent is 5 to 20% of the composition, and the alcohol is commercial ethyl alcohol.

6. The fuel gel as defined in claim 3, in which the gelating agent is 5 to 20% of the composition, and the alcohol is commercial isopropyl alcohol.

7. The fuel gel as defined in claim 3, in which the liquid fuel comprises alcohol admixed with up to 25% of another volatile, alcohol miscible, combustible liquid.

References Cited in the file of this patent

UNITED STATES PATENTS

| | | |
|---|---|---|
| 1,934,860 | Jones et al. | Nov. 14, 1933 |
| 2,102,005 | Jones et al. | Dec. 14, 1937 |
| 2,207,894 | Onderdonk | July 16, 1940 |
| 2,613,142 | Wiczer | Oct. 7, 1952 |